Blaikie & Clark,
Making Laths.
N°13,746. Patented Nov.6,1855.
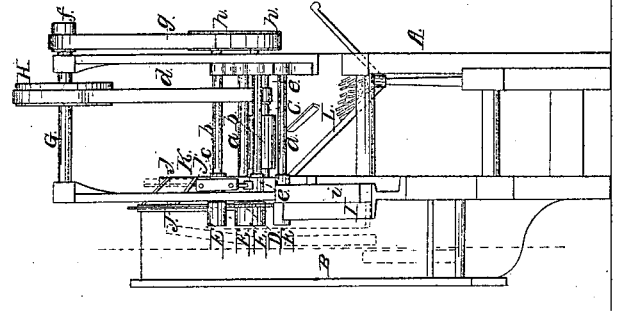
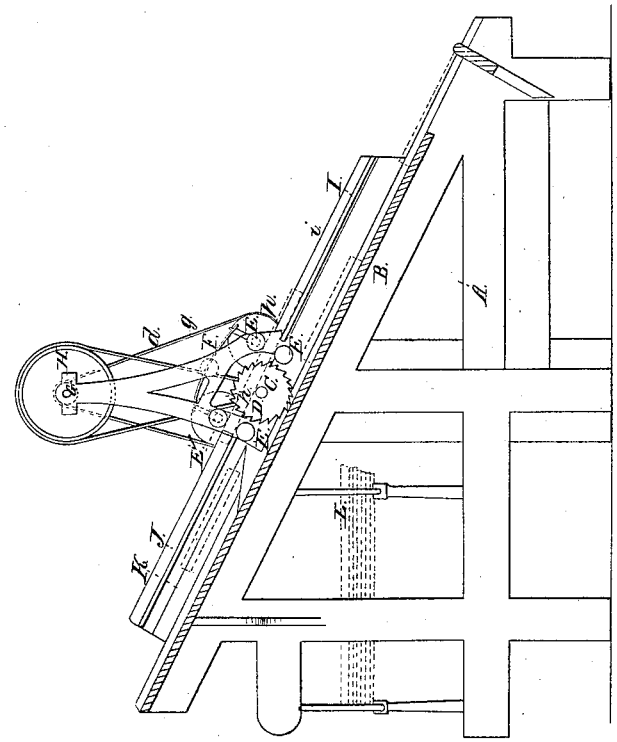

UNITED STATES PATENT OFFICE.

A. BLAIKIE AND W. CLARK, OF ST. CLAIR, MICHIGAN.

LATH-MACHINE.

Specification of Letters Patent No. 13,746, dated November 6, 1855.

*To all whom it may concern:*

Be it known that we, ANDREW BLAIKIE and W. CLARK, of St. Clair, in the county of St. Clair and State of Michigan, have invented a new and Improved Machine for Sawing Laths; and we do hereby declare that the following is a full, clear, and exact description of the same, reference being had to the annexed drawings, making a part of this specification, in which—

Figure 1, is a side view of our improvement, the return table being bisected longitudinally as indicated by the line (*x*), (*x*) Fig. 2. Fig. 2, is a front view of our improvement.

Similar letters of reference indicate corresponding parts in the two figures.

The nature of our invention consists in the employment or use of a feed and return table, separating plate, deflecting or guide plates, and feed rollers, and arranged as will be presently shown and described, whereby the block from which the laths are sawed is fed to the saw and the laths as they are sawed from the block guided into a rack, and the block returned to the operator or attendant to be again fed to the saw.

To enable others skilled in the art to make and use our invention, we will proceed to describe its construction and operation.

A, represents a framing, constructed in any proper manner to support the working parts of the machine.

B, represents an inclined table, which is secured to one side of the framing, A, and, C, is a saw shaft placed transversely on the framing, A, the saw, D, being attached to one end of the saw shaft, and about at the center of the inner side of the inclined table B.

E, E, E', E', are feed rollers, which are placed two at each side of the saw D, the rollers at each side of the saw being placed one above the other. The lower rollers, E, are attached to shafts (*a*), (*a*), which work in permanent bearings, but the rollers E', E', are attached to shafts (*b*), (*b*), the boxes (*c*), of which, adjoining the inclined table B, are sufficiently large to allow the rollers E', a requisite degree of play vertically, the bearings in the boxes (*c*), having a spring F, pressing upon them, by which spring the rollers E', are made to bear with sufficient pressure upon the block in order that it may be fed to the saw D.

G, represents a shaft placed transversely upon the upper part of the framing A. This shaft has a pulley H, upon it, around which a belt (*d*), passes, said belt also passing around a pulley (*e*), on the saw shaft, C. A pulley (*f*), is also attached to one end of the shaft, G, around which pulley a belt (*g*), passes, said belt also passing around pulleys (*h*), (*h*), at the ends of the shafts (*b*), (*b*), of the feed rollers E', E'.

To the inner side of the inclined table, B, below the saw, D, there is attached a feed table, I, the upper surface of which, is in line with the upper edge of the feed rollers E, E. This table is merely a narrow strip of metal, or wood, attached in any proper manner to the inclined table B, and has a guide strip (*i*), attached to its inner edge.

To the inner side of the inclined table, B, above the saw, D, there is attached a metallic plate J, the lower edge of which is just back of the upper pair of feed rollers, as clearly shown in Fig. 1. The plate J, is attached to a metallic stock, K, the back side of which is beveled or inclined or has inclined planes (*j*), attached to it, as shown in Fig. 2, and to the framing A, below the stock K, there is attached a rack, L, or any suitable receptacle for receiving the lath as they are sawed from the block.

Operation: The block from which the laths are sawed is placed upon the feed table, I, and its end is placed or pressed between the lower pair of feed rollers, E, E', by the attendant of the machine. The lower feed rollers feed the block to the saw, D, which cuts a lath from the block and the block passes between the upper feed rollers, the plate, J, entering the saw kerf. When the lath is sawed from the block it is directed or guided into the rack or receptacle L, and the block falls upon the inclined table B, and descends by its own gravity to the bottom of said table where the attendant stands and is again placed upon the feed table I, and another lath sawed from it and so on till the block is entirely sawed into laths. The inclined planes (*j*) serve as guide plates to throw the laths into the rack L.

The above machine requires but little attention, works rapidly and well, and it is not liable to get out of repair. The laths are all laid as they are sawed in a proper receptacle one attendant only being required to feed the blocks to the saw.

We do not claim separately the feed rollers and saw, for they are in common use, but

We claim—

The arrangement of the saw D, feed table, I, return table B, separating plate J, deflecting or guide plates (*j*), and feed rollers E, E', for the purpose specified.

ANDREW BLAIKIE.
     WALTER CLARK.

Witnesses:
 M. H. MILES,
 H. CHAMBERLIN.